United States Patent [19]

Thometzek et al.

[11] Patent Number: 5,589,222
[45] Date of Patent: Dec. 31, 1996

[54] HYDROPHOBIC FREE-FLOWING PELLETS, A PROCESS FOR THEIR PRODUCTION AND THEIR USE

[75] Inventors: Peter Thometzek, Krefeld, Germany; Heinrich Christ, Spilamberto, Italy

[73] Assignee: Ferro (Italia) S.r.l., Bologna, Italy

[21] Appl. No.: 595,514

[22] Filed: Feb. 1, 1996

Related U.S. Application Data

[63] Continuation of Ser. No. 510,331, Aug. 2, 1995, abandoned, which is a continuation of Ser. No. 72,105, Jun. 7, 1993, abandoned.

[30] Foreign Application Priority Data

Jun. 18, 1992 [IT] Italy .................................. MI92A1507

[51] Int. Cl.[6] .......................................................... B05D 7/00
[52] U.S. Cl. .......................... 427/215; 427/220; 427/221; 427/226; 427/385.5; 501/21; 501/24; 501/25; 264/123; 264/128; 264/134
[58] Field of Search ...................................... 427/215, 220, 427/221, 226, 385.5; 501/21, 24, 25; 264/123, 128, 134

[56] References Cited

U.S. PATENT DOCUMENTS 3,928,668  12/1975  Snow ...................................... 427/226
4,039,697  8/1977  Isawa et al. ............................... 427/27
4,659,586  4/1987  Schittenhelm et al. ................. 427/427

FOREIGN PATENT DOCUMENTS

| 0179379 | 4/1986 | European Pat. Off. . |
| 0492280A1 | 12/1991 | European Pat. Off. . |
| 0504683A1 | 3/1992 | European Pat. Off. . |
| 2015072 | 10/1971 | Germany . |
| 3232635 | 3/1984 | Germany . |

OTHER PUBLICATIONS

Derwent Abstract for European Patent Application No. EP-492280A.

Derwent Abstract for European Patent Application No. EP-504683A.

Primary Examiner—Shrive Beck
Assistant Examiner—David M. Maiorana
Attorney, Agent, or Firm—Rankin, Hill, Lewis & Clark

[57] ABSTRACT

This invention relates to hydrophobic free-flowing pellets having an average particle size of 5 to 150 μm, which consist of one or preferably more hydrophilic inorganic powders having a particle size of >0 to 30 μm and contain one or more hydrophobic polyorganosiloxanes in a quantity of 0.03 to 15% by weight, to a process for their production and to their use.

7 Claims, No Drawings

HYDROPHOBIC FREE-FLOWING PELLETS, A PROCESS FOR THEIR PRODUCTION AND THEIR USE

This is a continuation of application Ser. No. 08/510,331 filed on Aug. 2, 1995 now abandoned which is a continuation of application Ser. No. 08/072,105 filed Jun. 7, 1993 now abandoned.

This invention relates to hydrophobic free-flowing pellets having an average particle size of 5 to 150 μm, which consist of one or preferably more hydrophilic inorganic powders having a particle size of >0 to 30 μm and contain one or more hydrophobic polyorganosiloxanes in a quantity of 0.03 to 15% by weight, to a process for their production and to their use.

It is known that enamel powders can be electrically charged and can be applied to metal substrates in an electrical field with a potential difference of approx. 50,000 to 100,000 V. Powders having a resistivity of more than $10^{12}$ ohm-cm are suitable for electrostatic powder coating. Enamel powders normally have a resistivity of around $10^7$ ohm-cm. Accordingly, the particle surfaces of the enamel powders are coated with insulating substances which are added to the enamel frits in a quantity of 0.1 to 2% by weight either before or during dry grinding. The enamel powders thus treated have a resistivity of $10^{12}$ to $10^{16}$ ohm-cm. Silanols, isocyanates, silicon/nitrogen compounds, carbodiimides and organopolysilanols are used as the insulating substances (DE 2 015 072 and U.S. Pat. No. 3,928,668).

However, it is only possible in this way to obtain hydrophobic powders consisting of a single frit or of several chemically very similar frits. The use of hydrophobic powders consisting of any frits and/or glaze raw materials and/or inorganic pigments is not possible because separation of the multicomponent powder occurs during electrostatic application on account of the differences between the components in particle size distribution, density and charge. Accordingly, recycling is also not possible.

EP 179 379 describes a process for the electrostatic spraying of mixtures of different inorganic powders of high surface resistance to form agglomerates, in which unsaturated organic compounds are added to the powder mixtures either before or during dry grinding. The process is confined to inorganic powders of high surface resistance, in other words hydrophilic inorganic powders, such as frits, glasses, glaze raw materials, pigments or mixtures thereof, cannot be used.

In DE 2 440 964, inorganic powders are coated with 1 to 15% of a polymer. The inorganic particles have first to be treated with a surface treatment preparation to make them compatible with the polymer. The particles thus treated are then coated with the polymer by the air suspension method or by phase separation. The process is complicated and expensive and is not suitable for the handling of hydrophilic inorganic powders.

DE 3 232 635 describes the agglomeration of fine powders using acrylates or methacrylates as binders. The agglomerates obtained are not hydrophobic, show inadequate electrical resistance and are unsuitable for electrostatic powder coating.

The problem addressed by the present invention was to provide hydrophobic free-flowing products suitable for electrostatic powder coating which would be easy to produce, which would show high electrical resistance, which could even consist of one or more hydrophilic inorganic powders differing in their particle size distribution, in their specific gravity and/or in their electrical resistance (such as, for example, hydrophilic powders of low electrical resistance) and which would show no separation so that they could even be recycled.

This problem has surprisingly been solved by the hydrophobic free-flowing pellets according to the invention.

The present invention relates to hydrophobic, free-flowing pellets having an average particle size of 5 to 150 μm of one or more hydrophilic inorganic powders having an average particle size of >0 to 30 μm and containing one or more hydrophobic polyorganosiloxanes in a quantity of 0.03 to 15% by weight and preferably in a quantity of 0.05 to 3% by weight and, optionally, one or more temporary and/or permanent binders in a quantity of up to 15% by weight.

Hydrophilic inorganic powders are preferably glaze raw materials, such as for example clays, kaolins, feldspars, aluminium oxide, wollastonite, dolomite, calcium carbonate, zinc oxide, etc., frits, glasses, inorganic pigments, such as for example zirconium silicate, titanium dioxide, tin dioxide, iron oxides, mixed phase oxides, etc., metals, such as for example hard metals, metal alloys and metal oxides, nitrides, carbides, sulfides and borides, such as for example $ZrO_2$, $Si_3N$, SiC, B4C, WC, AlB, AlN, etc.

The frits and glasses preferably have the following composition:

| | |
|---|---|
| $SiO_2 + B_2O_3$ | 20 to 80% by weight |
| $Al_2O_3$ | 0 to 20% by weight |
| $R_2^1O + R_2O$ | 5 to 70% by weight |
| $TiO_2 + ZrO_2$ | 0 to 30% by weight |
| $PbO + Bi_2O_3 + P_2O_5$ | 0 to 80% by weight |
| $V_2O_5 + MoO_3 + WO_3$ | 0 to 10% by weight | in which
$R_2^1O=Li_2O+Na_2O+K_2O$ and
$R_2O=MgO+CaO+SrO+BaO+ZnO$.

Oxynitride glasses and/or oxycarbide glasses may also be used.

Both organic and inorganic binders may be used.

Preferred organic binders are temporary binders, such as starch and dextrin glues, cellulose ethers, such as for example methyl cellulose or carboxymethyl cellulose, polysaccharide-based binders, adhesives based on polyvinyl acetates, polyacrylates, polyvinyl alcohols, resin- or rubber-based dispersion adhesives, one- or two-component polymerization adhesives, polyaddition adhesives and polycondensation adhesives.

Preferred inorganic permanent binders are sodium silicate, potassium silicate, aluminium phosphate, more particularly monoaluminium monophosphate, chromium phosphate, more particularly monochromium phosphate, phosphoric acid, sodium aluminium phosphate, sodium aluminate, boron phosphate, aluminium silicate, sodium calcium silicate, potassium calcium silicate, silicophosphate, silica sol and $Al(OH)_3$ sol.

The binders mentioned above are preferably used either individually or in suitable combinations in a quantity of up to 15% by weight.

The present invention relates also to a process for the production of hydrophobic, free-flowing pellets having an average particle size of 5 to 150 μm and a content of polyorganosiloxanes of 0.03 to 15% by weight and, optionally, one or more temporary and/or permanent binders in a quantity of up to 15% by weight, characterized in that an aqueous emulsion of one or more hydrophobic polyorganosiloxanes in a quantity of 0.05 to 15% by weight polyorganosiloxane and preferably 0.05 to 3% by weight polyorganosiloxane is added to one or preferably more hydrophilic inorganic powders having an average particle size of >0 to 30 μm in a granulator, such as for example a mixing unit, positive mixer or pan granulator, optionally with addition of one or more temporary and/or permanent binders in aqueous medium in a quantity of up to 15% by weight, and the mixture is subsequently heated for up to 24 hours at a temperature of 120° to 600° C. and preferably at a temperature of 200° to 400° C.

The hydrophobic polyorganosiloxanes are preferably used in aqueous emulsion in the production of the hydrophobic pellets according to the invention. Uniform wetting of the powder particles with the emulsified polyorganosiloxane droplets is obtained in this way. The polyorganosiloxane droplets then form a hydrophobic layer of high electrical resistance around the pellet during the subsequent heating phase.

The polyorganosiloxanes used include, for example, trimethyl silyl polydimethyl siloxanes which, optionally, may also contain methyl phenyl or diphenyl siloxy groups.

The aqueous emulsion of the polyorganosiloxanes is preferably added together with another binder for granulation. However, the emulsion may also be added towards the end of the granulation process, in which case one or more temporary or permanent binders is/are added in the initial phase for wetting or agglomeration.

Preferred granulation units are mixing units, positive mixers, plan granulators or fluidized-bed granulators.

To solidify the granules and to remove the water present, the pellets have to be heated at temperatures of 120° to 600° C. and preferably at temperatures of 200° to 400° C. after agglomeration.

In another preferred embodiment, the pellets according to the invention are produced from an aqueous suspension of the hydrophilic inorganic powder with addition of the aqueous emulsion of the polyorganosiloxanes and, optionally, the other organic and/or inorganic binder(s) in a spray dryer.

The hydrophobic pellets may also be produced in a fluidized bed dryer, cylinder dryer or hot-gas reactor, preferably with strong turbulence (a Maurer Turbulator or a Babcock reaction chamber).

The pellets according to the invention do not emit dust because they contain less than 5% by weight and preferably less than 2% by weight of any particles smaller than 2 μm in diameter. In this way, the unwanted bubbles in glaze coatings after firing can be reduced in number. In hitherto known powders produced by dry grinding, the fine component of <2 μm above all is responsible for bubble formation in electrostatic powder coating.

By virtue of their excellent flow properties and high abrasion resistance, the pellets according to the invention may readily be recycled in the electrostatic application process, so that a yield of more than 97% by weight is obtained in the application of glazes.

The hydrophobic, free-flowing pellets according to the invention are preferably used for electrostatic application. For example, they may be used for coating floor tiles or wall tiles, porcelain, crockery, sanitary ceramics, bricks, building ceramics or other ceramic products.

The hydrophobic pellets according to the invention are preferably also used in electrostatic powder spraying for the production of enamel coatings, particularly colored enamel coatings.

In addition to electrostatic powder coating, the pellets according to the invention may also be applied by dry coating, for example by sieving, scattering or spraying with spray guns.

In another preferred application, the hydrophobic pellets according to the invention are incorporated in ceramic layers or media, such as for example plastics or lacquers.

The pellets according to the invention with a high content of one or more inorganic pigments are particularly suitable for incorporation in plastics or lacquers.

In one preferred embodiment of this particular application, free-flowing, hydrophobic, readily dispersible pellets are produced, preferably by spray drying, solely from one or more inorganic pigments with an aqueous emulsion of the organopolysiloxane(s) and optionally with addition of one or more temporary and/or permanent binders.

The invention is illustrated by the following Example.

EXAMPLE

In a 5 kg porcelain ball mill, the following products are reduced to an average particle size of approx. 10 μm with a >40 μm component of less than 1% by weight:

10% by weight of a ceramic frit based on $SiO_2$, $B_2O_3$, $Al_2O_3$ and $Na_2O$ 10% by weight of a ceramic frit based on $SiO_2$, $B_2O_3$, $Al_2O_3$ and $ZrO_2$ 24% by weight sodium feldspar 5% by weight zinc oxide 20% by weight wollastonite 6% by weight kaolin 8% by weight aluminium oxide 17% by weight zirconium silicate.

The dry grinding step is carried out with addition of 0.2% by weight propylene glycol.

2.0 kg of the fine inorganic powder mixture obtained and 60 g of an inorganic pigment based on $Fe_2O_3$, $ZrO_2$ and $SiO_2$ are introduced into an Eirich positive mixer and 460 g of a 32% by weight potassium silicate solution and 20 g of an aqueous emulsion of a hydrophobic polyorganosiloxane (Baysilon AC 3454, a product of Bayer AG, Leverkusen) are slowly added with intensive mixing. After intensive granulation for 5 minutes, the granules are heated for 2 hours at 250° C. in a drying cabinet.

After the coarse component larger than 200 μm in size has been removed by sieving, the granules (i.e., the pellets) obtained have a maximum particle size distribution at 40 μm, an electrical resistance of $4-10^{15}$ ohm-cm and a flow behavior of 98 g/30 seconds, as measured with a Sames instrument (Sames, Grenoble).

The method is described in detail by H. J. Schittenhelm in Mitteilungen VDEFa 33, 137–148 (1984).

The hydrophobic pellets are applied by electrostatic powder coating at 50 KV. 50 g of the pellets are applied to a 20×25 cm body provided with a white engobe. Firing takes place over a period of 70 minutes at a maximum temperature of 1170° C. in a roller furnace.

A silk-finish floor glaze with a fault-free surface and minimal undulation is obtained.

What is claimed is:

1. A process for the production of hydrophobic, free-flowing pellets having an average particle size of 5 to 150 μm comprising the steps of:

(i) providing a first hydrophilic inorganic powder and a second hydrophilic inorganic powder which is separate and distinct from said first inorganic powder;

(ii) providing an aqueous emulsion comprising one or more hydrophobic polyorganosiloxanes;

(iii) adding together in a granulator said first and said second inorganic powders and said aqueous emulsion to provide a mixture, said mixture comprising from about 0.05 to 15% by weight said hydrophobic polyorganosiloxane and processing said mixture in said granulator; and (iv) heating said mixture subsequent to said step (iii) for up to 24 hours at a temperature of from 120° to 600° C. to provide said free-flowing pellets.

2. A process for the production of hydrophobic free-flowing pellets according to claim 1, wherein said first and said second inorganic powders are selected from the group consisting of glaze raw materials, frits, glasses, inorganic pigments, metals, metal alloys, metal oxides, nitrides, carbides, sulfides and borides.

3. A process for the production of the hydrophobic, free-flowing pellets according to claim 1, wherein the quantity of said hydrophobic polyorganosiloxane in said mixture is from 0.05 to 3% by weight.

4. A process for the production of the hydrophobic, free-flowing pellets according to claim 1, wherein said granulator is selected from the group consisting of a mixing unit, a positive mixer, a pan granulator, a spray dryer, a fluidized bed dryer, a cylinder dryer or a hot-gas reactor.

5. A process for the production of the hydrophobic, free-flowing pellets according to claim 1, wherein at least one of a) one or more temporary binders in an aqueous medium and b) one or more permanent binders in an aqueous medium, in a quantity of up to 15% by weight, is added to said mixture.

6. A process for the production of the hydrophobic, free-flowing pellets according to claim 1, wherein said mixture is subsequently heated during said step iv for up to 24 hours at a temperature of 200° to 400° C.

7. A process for the production of hydrophobic free-flowing pellets according to claim 1 wherein said first hydrophilic inorganic powder and said second hydrophilic inorganic powder each have an average particle size of up to 30 μm.

* * * * *